3,089,869
ORGANIC ACID ESTERS OF ADENOSINE PHOSPHATES

Roland Yves Mauvernay, Riom, France, assignor to Laboratoire d'Analyses et de Recherches R. Y. Mauvernay, Riom, France
No Drawing. Filed Mar. 30, 1960, Ser. No. 18,473
Claims priority, application France July 6, 1959
14 Claims. (Cl. 260—211.5)

The present invention relates to organic acid esters of adenosine phosphates, and more particularly to adenosine-5-monophosphate esters and to methods of producing organic acid esters of adenosine phosphates.

It is a primary object of the present invention to provide a general method of producing organic acid esters of adenosine phosphates.

It is another object of the present invention to provide new organic acid esters of adenosine phosphates which have important improved properties as compared to the adenosine phosphates which serve as the starting material for the production of the new organic acid esters of the present invention.

Other objects and advantages of the present invention will be apparent from a further reading of the specification and of the appended claims.

With the above objects in view, the method of the present invention mainly comprises the production of adenosine phosphate esters having the following general formula:

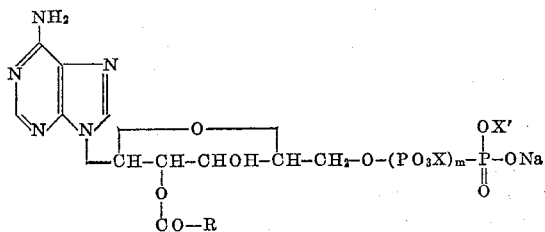

wherein X is selected from the group consisting of hydrogen and sodium, X' is selected from the group consisting of hydrogen and sodium, and OCOR is an organic carboxylic acid radical which comprises reacting the thiophenyl ester of said organic acid with a sodium adenosine phosphate having the following general formula:

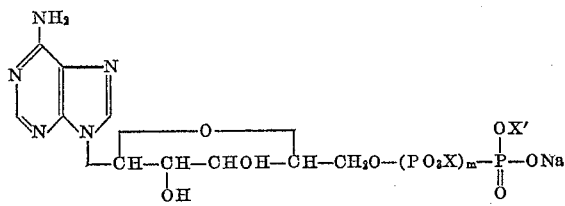

wherein X and X' have the same definitions as above so as to form thiophenol and said adenosine phosphate ester.

The method of the present invention is generally applicable to the production of all organic carboxylic acid esters of the various adenosine phosphates, i.e. of adenosine-5-monophosphoric acid (also known as 5-adenylic acid), hereinafter referred to as AMP, adenosine diphosphate, hereinafter referred to as ADP, and adenosine triphosphate, hereinafter referred to as ATP.

Among the compounds which can be produced in accordance with the present invention are compounds having the following general formula:

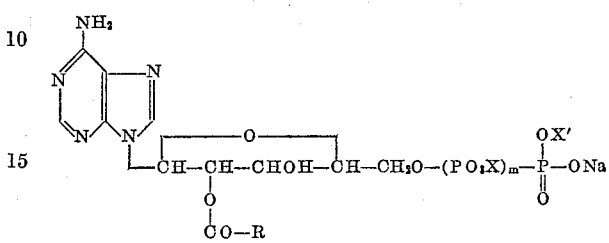

wherein X is selected from the group consisting of hydrogen and sodium, X' is selected from the group consisting of hydrogen and sodium, and OCOR is an organic carboxylic acid radical from an acid selected from the group consisting of nicotinic acid, acetylsalicylic acid, salicylic acid, para-amino salicylic acid, acetyl acetic acid, para-amino benzoic acid, valeric acid, lactic acid, pyruvic acid, pantothenic acid, folic acid, cholic acid, 2-phenylcinchoninic acid, hexahydro-2-oxo-1-H-thieno(3,4)-imidazolvaleric acid, acetyl-orthocresotic acid, lysine, glutamine, asparagine, glycine, tyrosine, phenylalanine, arginine, ornithine, citrulline, histidine, serine, thyroxine, creatine and sarcosine.

The organic esters of the various adenosine phosphates of the present invention have, as indicated above, the same use as the particular adenosine phosphate from which the ester is produced, however, the compounds of the present invention having somewhat improved properties.

Thus, for example, the esters of AMP may be used as muscle tissue preparations, these compounds having an improved property with respect to penetration of the cellular barrier. The esters of ADP and ATP act as the ADP and ATP themselves to help the organism to deposit glucose as glycogen. The new esters, however, of the present invention have somewhat improved properties in this respect.

The esters of adenosine-5-monophosphate (AMP) having the following general formula:

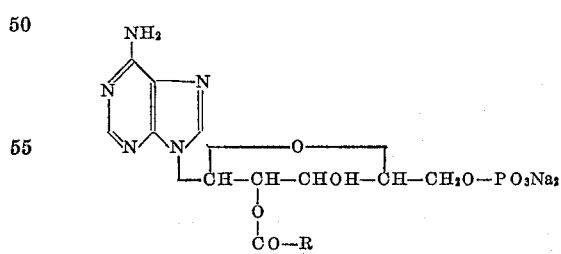

wherein OCOR has the same definition as above, are preferred in accordance with the present invention.

The most preferred esters are the nicotinic acid esters of AMP, ADP and ATP. The following nicotinic acid ester of adenosine-5-monophosphate is the most preferred compound having the desired properties in accordance with the present invention:

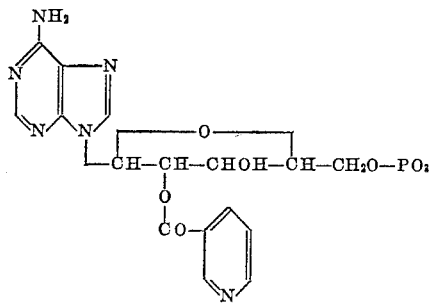

The nicotinic acid ester of adenosine diphosphate having the following structural formula:

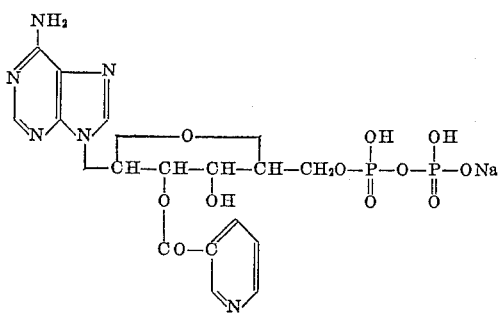

is another preferred ester, as is the nicotinic acid ester of adenosine triphosphate having the following structural formula:

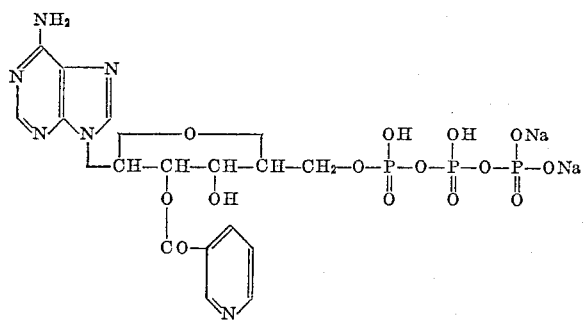

As indicated above, the esters of the present invention are produced by reacting a sodium salt (on the phosphoric acid) of the adenosine phosphate, for example, the disodium salt of adenosine-5-monophosphoric acid having the following structural formula:

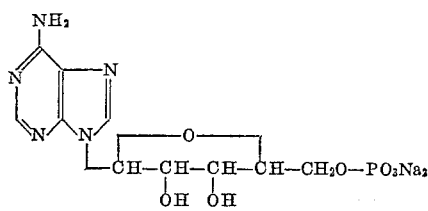

with the thiophenyl ester of the acid of which the adenosine phosphate ester is to be formed.

The thiophenyl ester is formed by reacting the chloride of the acid chosen with thiophenol. The reaction proceeds in accordance with the following equation:

The thiophenyl ester is then reacted with, for example, the disodium salt of adenosine-5-monophosphoric acid to form the ester of the AMP and thiophenol. The reaction proceeds as follows:

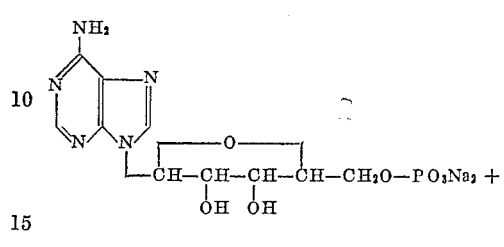

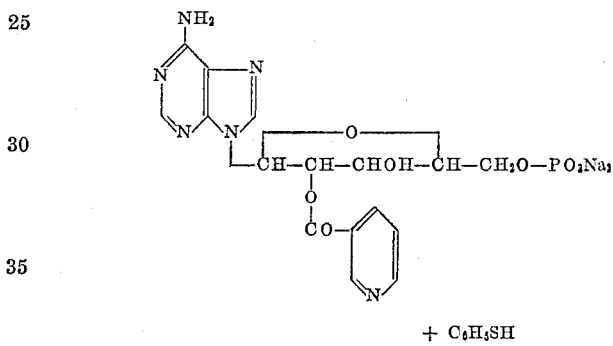

$+ C_6H_5SH$

The following is a more detailed description of the procedure in accordance with the present invention.

The acid chloride is formed by the controlled action of the acid with $SOCl_2$ and distillation of the excess reactant, or by reaction of phosphorus pentachloride on the acid in the presence of acetyl chloride, carbon tetrachloride or chloroform and precipitation of the chloride by ether. This chloride is filtered on a glass frit, washed with the solvent utilized, then by petroleum ether and dried under vacuum.

The thiophenyl ester is prepared by action of the acid chloride on thiophenol at a temperature depending upon the acid chloride used of between 50 and 100° C. A dissolution of the chloride in the thiophenol is observed with a liberation of hydrogen chloride.

The thiophenyl ester which is formed is precipitated by anhydrous ether and recovered. In certain cases, the precipitation is very slow and necessitates several days. The precipitate is washed several times with ether.

The disodium salt of adenosine-5'-monophosphoric acid is prepared by dissolving the acid in the calculated quantity of normal sodium hydroxide, that is the quantity calculated for producing the disodium salt. The solution which is obtained is evaporated to dryness under reduced pressure.

The condensation of the thiophenyl ester with the sodium-adenosine-5'-phosphate proceeds as follows:

The calculated quantity of the thiophenyl ester and of the sodium adenosine phosphate (1 mol of each in most cases, and preferably 2 mols of the thiophenyl ester per each mol of the adenosine phosphate in the case of producing amino acid esters of the adenosine phosphate) are dissolved in a common solvent therefor such as dimethyl sulfoxide. The reaction then proceeds for about 15 minutes with agitation at a temperature of, for example, between 80–120° C. depending upon the nature of the thiophenyl ester. The reaction mass is then cooled and the adenylic ester which is formed is precipitated by acetone. The precipitate is recovered and washed with isopropyl alcohol and with ether.

The adenylic ester which is formed is purified by separation thereof from the accompanying impurities (acid and non-transformed adenosine phosphate) by a combination of the following treatments: adsorption on ion exchangers (for example Dowex 2) and differential elution, dissolution by organic solvents, precipitation of the ester by mercuric acetate and elimination of the mercury by treatment with hydrogen sulfide.

The process of the present invention which, as described, is a general process is particularly suitable for the production of esters of biologically active organic acids and AMP. The following are among the esters produced:

Nicotinic acid—AMP
Acetylsalycilic acid—AMP (aspirin—AMP)
Salicyclic acid—AMP
Para-aminosalicyclic acid—AMP
Acetylacetic acid—AMP
Para-aminobenzoic acid—AMP
Valerianic acid—AMP
Lactic acid—AMP
Pyruvic acid—AMP
Pantothenic acid—AMP
Folic acid—AMP
Cholic acid—AMP
Phenylquinoleic carboxylic acid—AMP (Atophan—AMP)
Hexahydro - 2 - oxo-1-thieno-(3,4)imidazol-isovalerianic acid—AMP (biotine—AMP)
Acetylorthocresotinic acid—AMP (cresopirine—AMP)
Methionine—AMP
Valine—AMP
Leucine—AMP
Alanine—AMP
Norvaline—AMP
Lysine—AMP
Glutamine—AMP
Asparagine—AMP
Glycine—AMP
Tyrosine—AMP
Phenylalanine—AMP
Arginine—AMP
Ornithine—AMP
Citrulline—AMP
Histidine—AMP
Serine—AMP
Thyroxine—AMP
Creatine—AMP
Sarcosine—AMP The above method is equally applicable to the production of esters of the above acids with a ADP and ATP.

The following examples are given to more fully illustrate the present invention. The scope of the invention is not, however, meant to be limited to the specific details of the examples.

EXAMPLE I

*Preparation of the Nicotinic Acid Ester of AMP*

5 g. of nicotinic acid are suspended in a minimum quantity of benzene. 15 cc. of thionyl chloride are added thereto and the mixture is moderately heated until the liberation of gas ceases. The benzene and the excess of thionyl chloride are removed under vacuum. There is thus obtained the chlorohydrate of nicotinic acid chloride.

2 parts of thiophenol are mixed with 1 part of the nicotinic acid chloride and the mixture is heated at 70–80° C. until the liberation of hydrochloric acid has ceased. The solution is then filtered and the chlorohydrate of the thiophenyl ester is precipitated by the addition of anhydrous ether.

After drying there is obtained a white, pulverulent product which is the thiophenyl ester of nicotinic acid and which melts at 120–121° C.

2 millimols of the thiophenyl ester, and 1 millimol of the disodium salt of AMP are mixed with 5 cc. of dimethyl sulfoxide. This mixture is heated to 100° C. during the time period of 15 minutes. After cooling precipitation is accomplished by acetone and the precipitate is washed with isopropanol and ether. The unreacted AMP is removed by passage through a column of Dower II.

EXAMPLE II

*Preparation of AMP-Nor-Valine Ester*

1.17 g. of nor-valine, 3 g. of phosphorus pentachloride and 15 cc. of chloroform are mixed together, the mixture is cooled to ice temperature and agitated for two hours. The mixture is subsequently agitated at ambient temperature for four hours. A solid white product is obtained which is washed three times with carbon tetrachloride to remove the excess of phosphorus pentachloride and then with petroleum ether. The product is then dried for 1 hour in a dessicator under vacuum.

2 parts of thiophenyl and 1 part of nor-valine chloride are moderately heated at a temperature of 40–50° C. A strong liberation of hydrogen chloride occurs and the reaction is completed after about 1 and ½ hours. The reaction mixture is filtered and the reactant is precipitated by ether. The precipitation starts after 24 hours in a refrigerator. A white, pulverulent product is recovered after 5 days, this product melting at 170–172° C. At a temperature of about 150° C. a decomposition of the product is already noticed with yellowing and evaporation.

1 millimol of disodium AMP and 2 millimols of thiophenyl ester of nor-valine are mixed with 5 cc. of dimethyl sulfoxide and the mixture is heated at 100° C. and the reaction is permitted to continue for 15 minutes under vigorous agitation. The reaction product is precipitated by acetone, washed 3 times with 5 cc. of isopropanol and dried with ether. There is thus obtained a mixture of free AMP, free amino acid and the ester of nor-valine and AMP. The free AMP is removed by passage through a column of Dower II.

EXAMPLE III 0.01 mols of monosodium-ADP and 0.01 mol of the thiophenyl ester of nicotinic acid are dissolved in dimethyl sulfoxide. The reaction mixture is heated for 15 minutes at a temperature of 100° C. under agitation. The reaction mixture is then cooled and the nicotinyl ester of ADP is precipitated by acetone. The precipitate is recovered and washed with isopropyl alcohol and ether.

The nicotinyl-ADP ester which is formed is purified by adsorption on ion exchangers (Dowex II) and differential elution.

EXAMPLE IV 0.01 mol of the disodium salt of ATP and 0.01 mol of the thiophenyl ester of nicotinic acid are dissolved in dimethyl sulfoxide. The reaction mixture is heated for 15 minutes at a temperature of 100° C. with agitation. The reaction mixture is then cooled and the ester of nictinic acid and ATP is precipitated by acetone. The precipitate is recovered and washed with isopropyl alcohol and ether.

The nicotinyl-ATP ester which is formed is purified by adsorption on ion exchangers (Dowex II) and differential elution.

EXAMPLE V 0.01 mol of the monosodium salt of ADP and 0.01 mol of the thiophenyl ester of valine are dissolved in dimethyl sulfoxide. The reaction mixture is heated for 15 minutes with agitation at a temperature of 100° C. The reaction mixture is then cooled and the ester of valine and ADP is precipitated by acetone. The precipitate is recovered and washed with isopropyl alcohol and ether.

The valine-ADP ester which is formed is purified by adsorption on ion exchangers (Dowex II) and differential elution.

EXAMPLE VI 0.01 mol of the disodium salt of ATP and 0.01 mol of the thiophenyl ester of valine are dissolved in dimethyl sulfoxide. The reaction mixture is heated for 15 minutes with agitation at a temperature of 100° C. The reaction mixture is then cooled and the ester of valine and ATP is precipitated by acetone. The precipitate is recovered and washed with isopropyl alcohol and ether.

The valine-ATP ester which is formed is purified by adsorption on ion exchangers (Dowex II) and differential elution.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound having the following general formula:

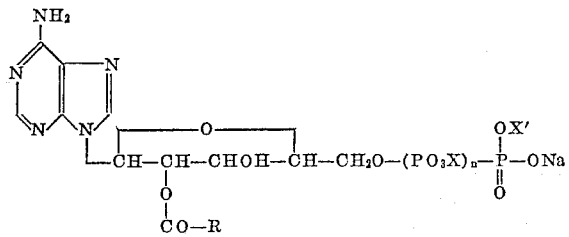

wherein X is selected from the group consisting of hydrogen and sodium, X' is selected from the group consisting of hydrogen and sodium, and OCOR is an organic carboxylic acid radical from an acid selected from the group consisting of nicotinic acid, acetylsalicylic acid, salicylic acid, para-amino salicylic acid, acetyl acetic acid, para-amino benzoic acid, valeric acid, lactic acid, pyruvic acid, pantothenic acid, folic acid, cholic acid, 2-phenyl-cinchoninic acid, hexahydro-2-oxo-1-H-thieno(3,4)-imidazol-valeric acid, acetyl-orthocresotic acid, lysine, glutamine, asparagine, glycine, tyrosine, phenylalanine, arginine, ornithine, citrulline, histidine, serine, thyroxine, creatine and sarcosine.

2. The nicotinic acid ester of adenosine-5-monophosphate having the following structural formula:

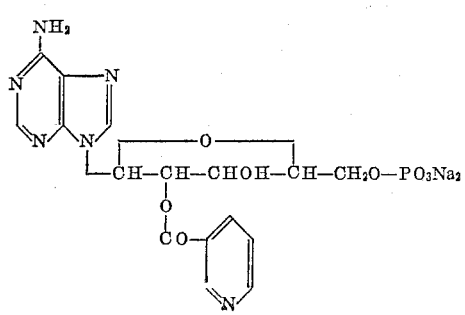

3. The nicotinic acid ester of adenosine diphosphate having the following structural formula:

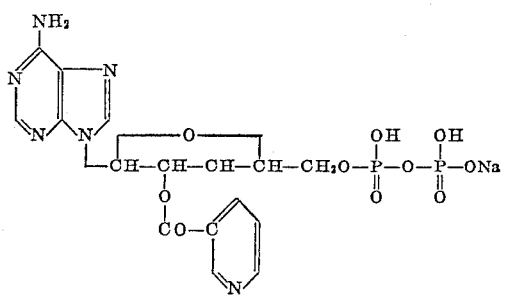

4. The nicotinic acid ester of adenosine triphosphate having the following structural formula:

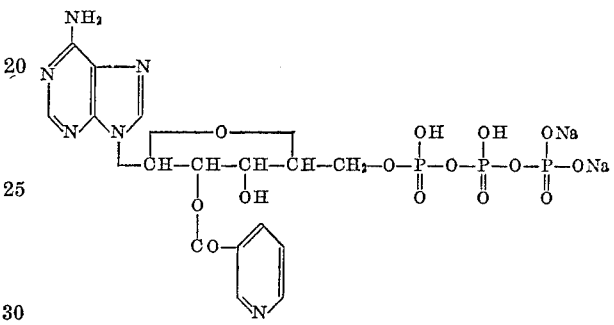

5. A method of producing adenosine phosphate esters having the following general formula:

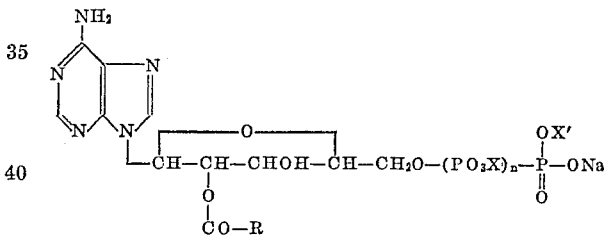

wherein X is selected from the group consisting of hydrogen and sodium, X' is selected from the group consisting of hydrogen and sodium, and OCOR is an organic carboxylic acid radical which comprises reacting the thiophenyl ester of said organic acid with a sodium adenosine phosphate having the following general formula:

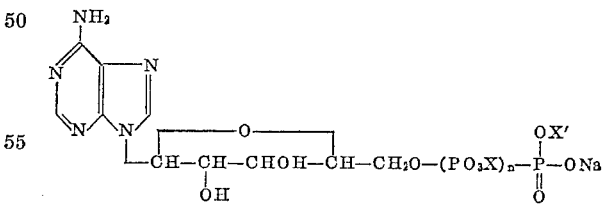

wherein X and X' have the same definitions as above so as to form thiophenol and said adenosine phosphate ester.

6. A method of producing adenosine phosphate esters having the following general formula:

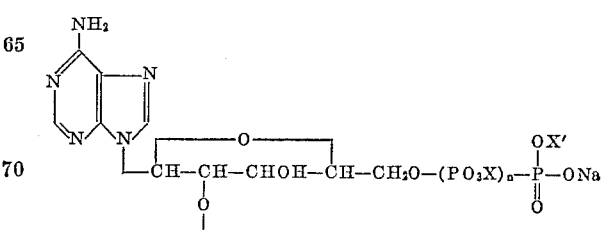

wherein X is selected from the group consisting of hydrogen and sodium, X' is selected from the group consisting of hydrogen and sodium, and OCOR is an organic carboxylic acid radical which comprises reacting the thiophenyl ester of said organic acid with a sodium adenosine phosphate having the following general formula:

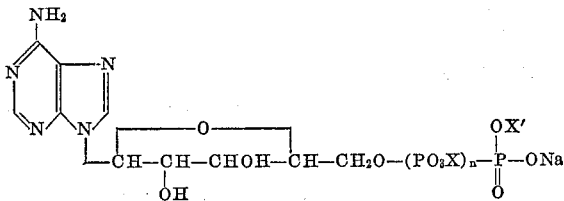

wherein X and X' have the same definitions as above, dissolved in a solvent for said thiophenyl ester and said sodium adenosine phosphate, so as to form thiophenol and said adenosine phosphate ester.

7. A method of producing adenosine phosphate esters having the following general formula:

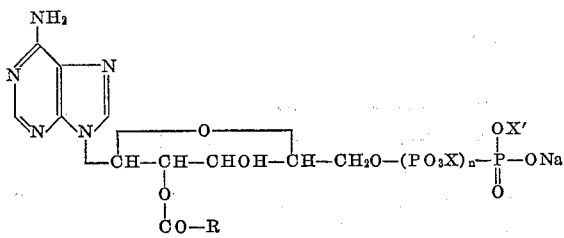

wherein X is selected from the group consisting of hydrogen and sodium, X' is selected from the group consisting of hydrogen and sodium, and OCOR is an organic carboxylic acid radical which comprises reacting the thiophenyl ester of said organic acid with a sodium adenosine phosphate having the following general formula:

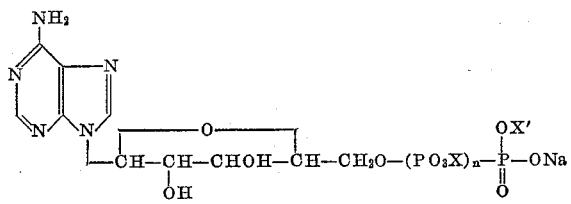

wherein X and X' have the same definitions as above, dissolved in dimethyl sulfoxide, so as to form thiophenol and said adenosine phosphate ester.

8. A method of producing adenosine phosphate esters having the following general formula:

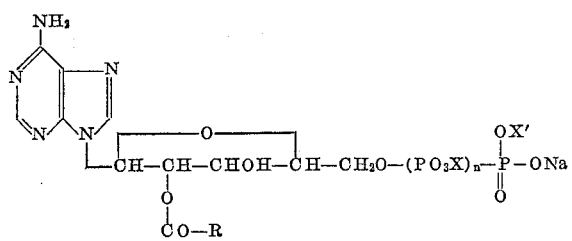

wherein X is selected from the group consisting of hydrogen and sodium, X' is selected from the group consisting of hydrogen and sodium, and OCOR is an organic carboxylic acid radical which comprises heating the thiophenyl ester of said organic acid with a sodium adenosine phosphate having the following general formula:

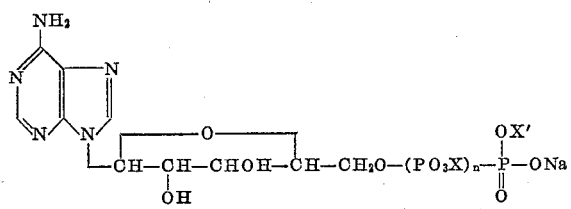

wherein X and X' have the same definitions as above, dissolved in a solvent of said thiophenyl ester and said sodium adenosine phosphate at a temperature of 80–120° C., so as to form thiophenol and said adenosine phosphate ester.

9. A method of producing adenosine phosphate esters having the following general formula:

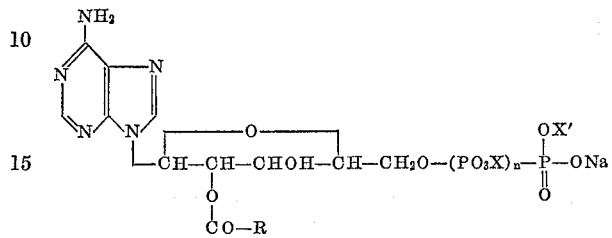

wherein X is selected from the group consisting of hydrogen and sodium, X' is selected from the group consisting of hydrogen and sodium, and OCOR is an organic carboxylic acid radical which comprises heating the thiophenyl ester of said organic acid with a sodium adenosine phosphate having the following general formula:

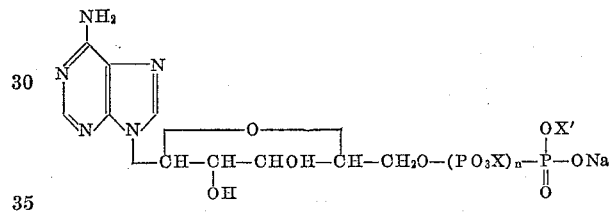

wherein X and X' have the same definitions as above, dissolved in dimethyl sulfoxide at a temperature of 80–120° C., so as to form thiophenol and said adenosine phosphate ester.

10. A method of producing adenosine phosphate esters having the following general formula:

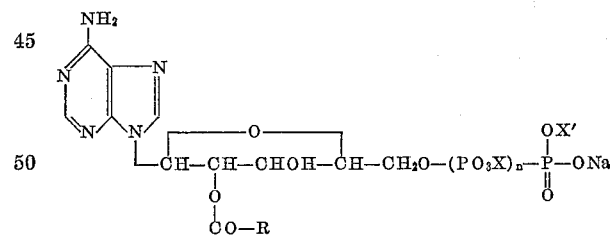

wherein X is selected from the group consisting of hydrogen and sodium, X' is selected from the group consisting of hydrogen and sodium, and OCOR is an organic carboxylic acid radical which comprises reacting the thiophenyl ester of said organic acid with a sodium adenosine phosphate having the following general formula:

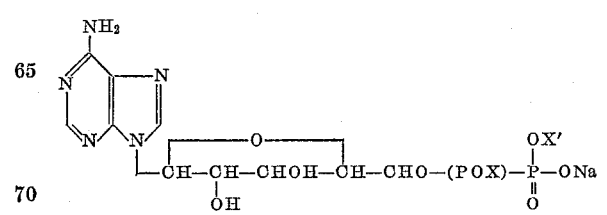

wherein X and X' have the same definitions as above as so to form thiophenol and said adenosine phosphate ester; absorbing said adenosine phosphate ester on an ion exchanger; and eluting said adenosine phosphate ester from said ion exchanger.

11. A method of producing adenosine phosphate esters having the following general formula:

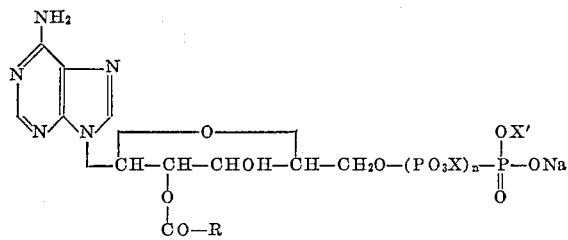

wherein X is selected from the group consisting of hydrogen and sodium, X' is selected from the group consisting of hydrogen and sodium, and OCOR is an organic carboxylic acid radical which comprises reacting the thiophenyl ester of said organic acid with a sodium adenosine phosphate having the following general formula:

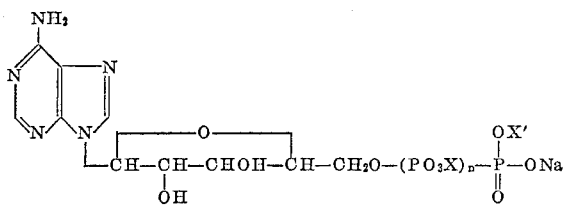

wherein X and X' have the same definitions as above, dissolved in a solvent for said thiophenyl ester and said sodium adenosine phosphate, so as to form thiophenol and said adenosine phosphate ester; adsorbing said adenosine phosphate ester on an ion exchanger; and eluting said adenosine phosphate ester from said ion exchanger.

12. A method of producing adenosine phosphate esters having the following general formula:

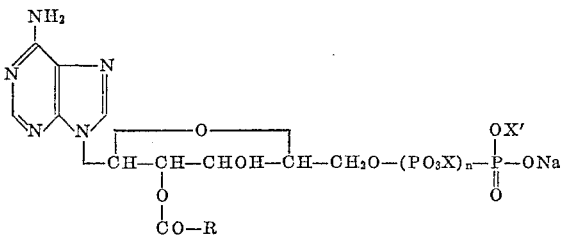

wherein X is selected from the group consisting of hydrogen and sodium, X' is selected from the group consisting of hydrogen and sodium, and OCOR is an organic carboxylic acid radical, which comprises reacting the thiophenyl ester of said organic acid with a sodium adenosine phosphate having the following general formula:

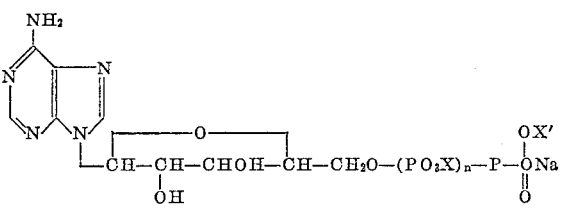

wherein X and X' have the same definitions as above, dissolved in dimethyl sulfoxide, so as to form thiophenol and said adenosin phosphate ester; adsorbing said adenosine phosphate ester on an ion exchanger; and eluting said adenosine phosphate ester from said ion exchanger.

13. A method of producing adenosine phosphate esters having the following general formula:

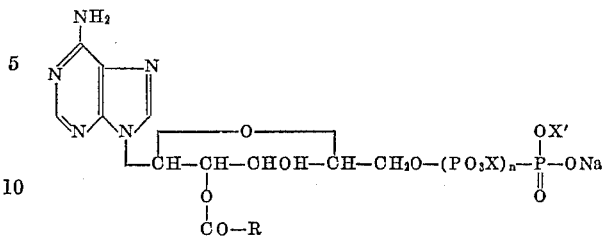

wherein X is selected from the group consisting of hydrogen and sodium, X' is selected from the group consisting of hydrogen and sodium, and OCOR is an organic carboxylic acid radical which comprises heating the thiophenyl ester of said organic acid with a sodium adenosine phosphate having the following general formula:

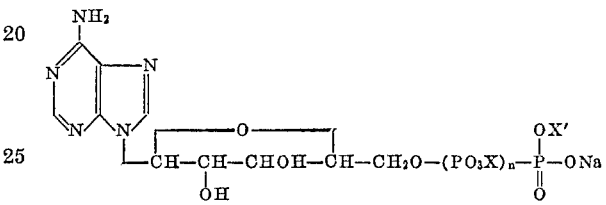

wherein X and X' have the same definitions as above, dissolved in a solvent for said thiophenyl ester and said sodium adenosine phosphate at a temperature of 80–120° C., so as to form thiophenol and said adenosine phosphate ester; adsorbing said adenosine phosphate ester on an ion exchanger; and eluting said adenosine phosphate ester from said ion exchanger.

14. A method of producing adenosine phosphate esters having the following general formula:

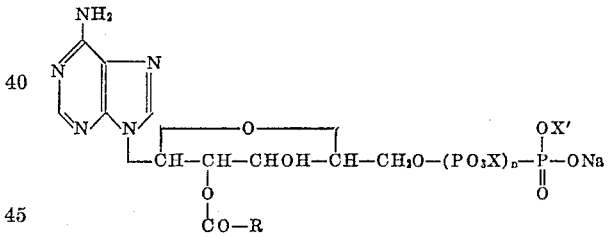

wherein X is selected from the group consisting of hydrogen and sodium, X' is selected from the group consisting of hydrogen and sodium, and OCOR is an organic carboxylic acid radical which comprises heating the thiophenyl ester of said organic acid with a sodium adenosine phosphate having the following general formula:

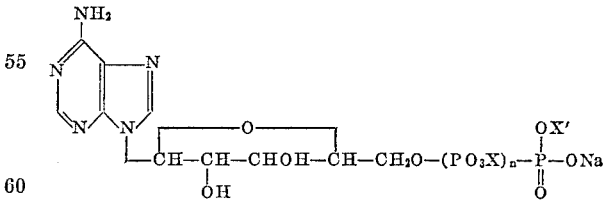

wherein X and X' have the same definitions as above, dissolved in dimethyl sulfoxide at a temperature of 80–120° C., so as to form thiophenol and said adenosine phosphate ester; adsorbing said adenosine phosphate ester on an ion exchanger; and eluting said adenosine phosphate ester from said ion exchanger.

References Cited in the file of this patent

UNITED STATES PATENTS 2,700,028    Lipton                Jan. 18, 1955

OTHER REFERENCES

Chem. Abst. 52 (1958), 2027g—an abstract of Huber—Chem. Ber. (Berlin), 89 (1956), 2853–62.